United States Patent [19]

Shah et al.

[11] 3,896,702

[45] July 29, 1975

[54] POWER STEERING GEAR WITH RELIEF VALVE ON POWER PISTON

[75] Inventors: Mahendrakumar Bhogilal Shah, West Lafayette; Uwe Frank Grossmann, Lafayette, both of Ind.

[73] Assignee: TRW Inc., Cleveland, Ohio

[22] Filed: July 27, 1973

[21] Appl. No.: 383,392

[52] U.S. Cl. .................... 91/375 A; 91/422; 91/437
[51] Int. Cl. ............................................... F15b 9/10
[58] Field of Search ............ 91/436, 437, 438, 439, 91/422, 375 A

[56] References Cited
UNITED STATES PATENTS

| | | | |
|---|---|---|---|
| 2,022,698 | 12/1935 | Vickers | 91/439 |
| 2,378,409 | 6/1945 | Joy | 91/422 |
| 2,948,263 | 8/1960 | Royer | 91/422 |
| 3,602,101 | 8/1971 | Jablonsky | 91/437 |
| 3,602,102 | 8/1971 | Fenari | 91/438 |
| 3,606,819 | 9/1971 | Venable et al. | 91/375 A |

*Primary Examiner*—Paul E. Maslousky

[57] ABSTRACT

A vehicular power steering system including an integral power steering gear having a housing, a power cylinder, a power piston with rack teeth formed thereon, a sector gear having teeth in driven engagement with the rack teeth and fluid pressure relief valves located in the power piston so as to reduce the damaging effect of road shock to the teeth of the rack and sector gear by reducing the rate of rise of road shock with respect to the rate of rise of tooth stress by shortening relief valve response time.

4 Claims, 3 Drawing Figures

POWER STEERING GEAR WITH RELIEF VALVE ON POWER PISTON

BACKGROUND OF THE INVENTION

1. Field of the Invention

This invention relates generally to the field of vehicular power steering systems, and is more particularly concerned with vehicular power steering systems which employ an integral power steering gear.

2. Description of the Prior Art

It is well known in the art to utilize integral power steering gear in a variety of vehicular power steering systems. An integral power steering gear basically comprises a housing including a hydraulic cylinder, a power piston in the cylinder, a cross shaft for connection to the mechanical steering linkage of the vehicle and a control valve including a follow-up arrangement for controlling the flow of pressurized fluid to and from the hydraulic cylinder to control the operation of the power piston and the cross shaft in response to receipt of a turning signal. The turning or steering signal is generally provided by rotation of a steering shaft which is journaled for rotation on the housing of the steering gear and which is connected to the valve mechanism for controlling the flow of fluid to and from the hydraulic cylinder. Integral power steering gear is employed, for example, in vehicular power steering systems for both on and off-the-road equipment such as trucks, buses, farm equipment and the like.

The power piston is generally restrained against rotation about its axis and has a gear rack formed thereon having teeth which mesh with the teeth of a sector gear carried on or formed on the cross shaft. As the power piston is moved axially in the hydraulic cylinder it provides a corresponding rotational movement to the cross shaft through the teeth of the rack gear and the sector gear to in turn manipulate the steered wheels of the vehicle.

In many applications, substantial forces are transmitted through the teeth of the rack and sector gear. As the axial loading on the steered wheels increases, the energy required to turn the wheels increases, particularly in the static condition where the vehicle is standing still. The teeth of the rack and the sector gear must therefore be designed and constructed to withstand very substantial loads imposed thereon.

One source of substantial loading of the teeth of the rack and the sector gear is road shock wherein a force is transmitted from the steered wheels to the rack teeth by way of the steering linkage and the sector gear. A substantial shock load which may far surpass the load required to turn the steered wheels, even in a static condition, may be generated if, for example, the steered wheels of a vehicle running at a fairly substantial speed encounter an abutment such as a rock or boulder, a curb or a ditch. The forces transmitted through the steered wheels to the piston rack in such cases can often cause greater tooth stress than would result from any normal operating condition. Also, the forces generated and transmitted due to such a shock load are developed much more rapidly than the forces developed during normal turning operations and the transmission time of such forces is very short and, for all practical purposes, may be considered as being almost instantaneous.

Power steering systems are normally provided with a pressure relief mechanism to protect the system components in response to excessive pressure levels at the discharge side of the power pump. The pressure relief mechanism is generally in the form of a relief valve which operates at a predetermined pressure level to effectively shunt the high pressure fluid to the power pump reservoir.

The art also recognizes the utilization of mechanically operated unloading valves in an integral power steering gear, the unloading valves ordinarily set to trip at a predetermined position of the piston near the ends of travel of the piston to allow fluid to pass from one side of the piston to the other and reduce the load on the power pump. Such unloading valves prevent fluid flow across the system relief mechanism. The use of unloading valves is, however, a most exact technique in that the preset annular travel of the cross shaft rarely coincides with that required to steer the steerable wheels of a vehicle through their full travel. When the preset angular travel is greater than the full turning travel of the steerable wheels and the steerable wheels reach a mechanical full travel lock position, the unloading valves must operate to prevent excessive loading of the mechanical linkage between the piston rack teeth and the steered wheels.

The present invention is therefore directed to reducing system relief time and to the elimination of unloading valves in a vehicular power steering system which utilizes an integral power steering gear.

SUMMARY OF THE INVENTION

In view of the foregoing, it is therefore a primary object of the invention to provide an improved power steering system which employs a system relief mechanism which is as close as possible to the source of forces created by road shock.

It is another object of the invention to provide an improved integral power steering gear which enjoys the advantages provided by unloading valves, but which eliminates the necessity for mechanical tripping of unloading valves.

Another object of the invention is to provide an improved integral power steering gear in which system relief and unloading functions are provided by a single valve structure which is located as close as possible to the source of load shock.

An integral power steering gear generally employs a hydraulic cylinder in which is mounted a power piston having rack teeth formed thereon for meshing engagement with the teeth of a sector gear. The sector gear is formed on or carried on a shaft adapted for connection to the steering linkage of a vehicle. The power piston is moved axially through the hydraulic cylinder by the rotation of a steering shaft which is connected to a valve mechanism for directing pressurized fluid to the appropriate side of the piston and which is also connected in driving engagement with the power piston for axially advancing the piston through the hydraulic cylinder. According to the present invention, a relief mechanism is incorporated within the power piston and comprises a pair of relief valves which respond to excessive pressures at respective ends of the power piston to connect the chambers at the ends of the power piston in fluid communication. These excessive pressures may be due to forces transmitted in response to road shock or they may be due to pressure build up at the maximum turn of the steered wheels. In either case, the respective pressure relief valve automatically responds to permit the flow of hydraulic fluid from one hydraulic chamber to the other.

The potential energy of the hydraulic pressure is converted into heat energy as the hydraulic fluid flows through a pressure relief valve due to the throttling of fluid flow through the valve and causes an increase in the temperature of the hydraulic fluid. In prior systems wherein the pressure relief valve is conventionally located within the power pump, the hydraulic fluid has only a short flow path during a relief condition and heat dissipation is, therefore, at a minimum. Thus, the fluid temperature is increased. It is therefore another object of the invention to provide a longer flow path for the hydraulic fluid during a relief condition to increase heat dissipation and maintain the hydraulic fluid at a lower temperature.

Advantageously, the foregoing objective is also achieved in the present invention through the provision of the system relief mechanism within the power piston so that during a relief condition, the hydraulic fluid must traverse a longer flow path through the fluid passages and valving mechanism of the steering gear, rather than merely being shunted to the reservoir of the power pump.

BRIEF DESCRIPTION OF THE DRAWINGS

Other objects, features and advantages of the invention, together with its organization, construction and operation will be best understood from the following detailed description of a preferred embodiment of the invention taken in conjunction with the accompanying drawings, on which.

DESCRIPTION OF THE PREFERRED EMBODIMENT

Figure 1:
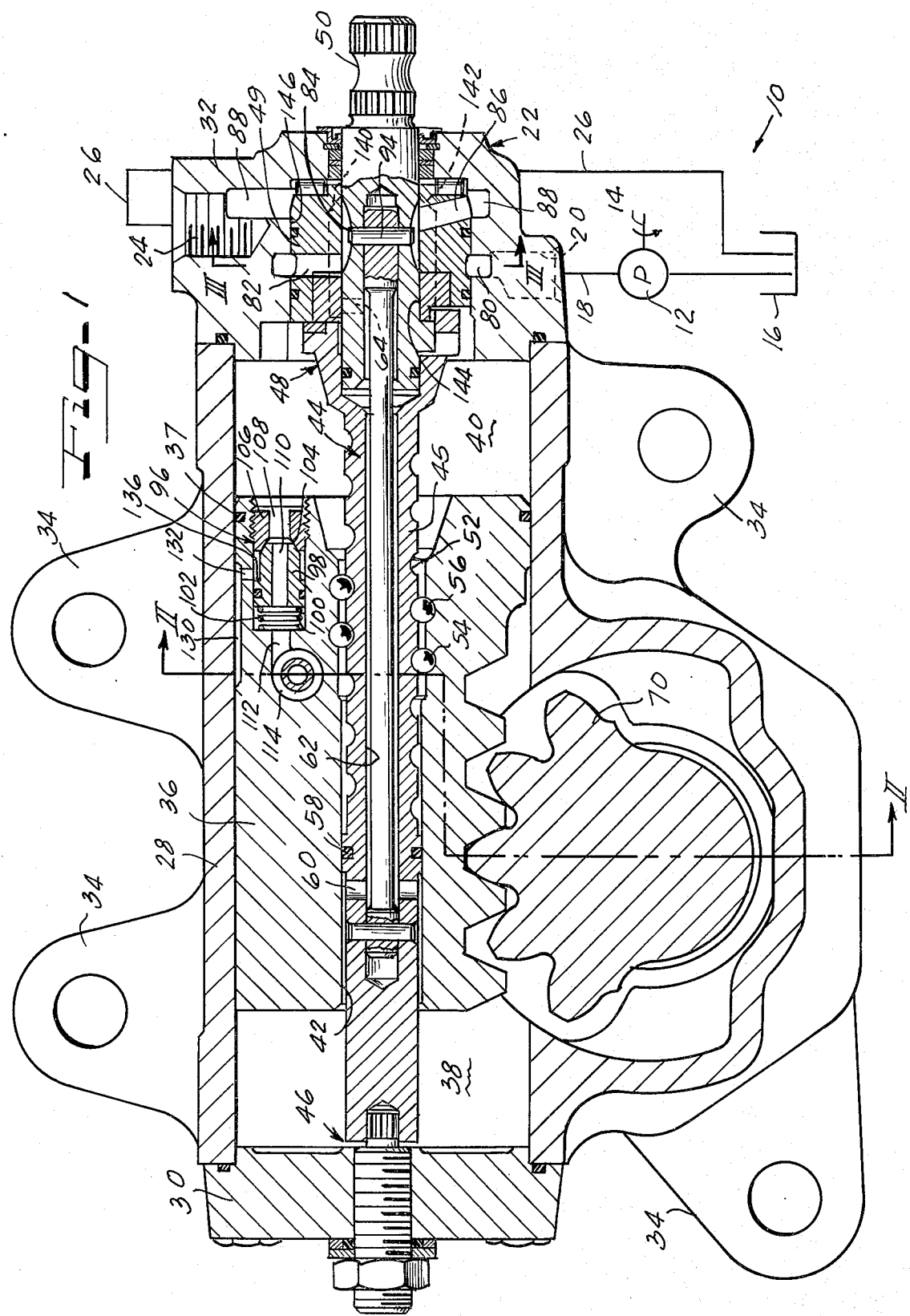
FIG. 1 is a representation of a power steering system constructed in accordance with the principles of the present invention, the integral power steering gear of the system being illustrated in a sectional elevation and the remainder of the system being schematically illustrated.

A vehicular power steering system is illustrated in FIG. 1 and generally referenced with the numeral 10. The system comprises a power fluid pump 12 which draws hydraulic fluid from a reservoir 16 and discharges the fluid at a sufficient flow rate and pressure, for example 20 G.P.M. at 1000-2000 p.s.i., by way of a fluid supply header 18 to an inlet port 20 of an integral power steering gear 22. The fluid is returned to the reservoir 16 from an outlet port 24 of the steering gear 22 by way of a return header 26.

The power fluid pump 12 is driven by means of a shaft 14 which is in turn connected in driving relation to the engine of a vehicle on which the system 10 is mounted. Preferably, the pump 12 is of the positive displacement type and capable of producing a substantial pressure head.

As mentioned above, it has been a conventional practice in vehicular power steering systems to provide a pressure relief mechanism by which the supply and return sides of the pump are placed in communication with one another upon the occurrence of a predetermined fluid pressure at the discharge side of the pump. The pressure at which the pressure relief mechanism is set is commonly called the "relief pressure." The various hydraulic and mechanical components within a power steering system are designed to operate at relief pressure and it is the function of the pressure relief mechanism to ensure that the power steering system is not subjected to fluid pressures beyond design or relief pressure by short circuiting the various components in the hydraulic circuit and communicating the discharge side of the pump with the return side of the pump.

Heretofore, such pressure relief mechanisms, commonly in the form of fluid pressure relief valves, have been mounted within the casing or body of the fluid pump so that the fluid itself is short circuited from the high pressure side to the low pressure side of the pump within the casing. In instances where the fluid pressure relief valve has not been mounted within the pump casing, the valve has been generally mounted immediately at the down-stream side of the pump discharge and connected by means of an external conduit to the suction side of the pump. In accordance with the principles of the present invention, however, the pressure relief mechanism is located within the power steering system 10 so as to be as close as possible to the source of excessive pressure due to road shock. More specifically, the pressure relief mechanism has been given the general reference character 96 and is located in the power piston. Advantageously, the pressure relief mechanism 96 in this location is also immediately adjacent and in fluid communication with the pressure rise chambers and therefore able to also respond very rapidly to any excessive pressure condition within the hydraulic cylinder as will be set forth in greater detail below. An underlying discovery with respect to the relationship of the pressure relief mechanism and the hydraulic cylinder chambers at each end of the power piston is that the rate of rise of impact or road shock to which the integral power steering gear 22 may be subjected and the rate of rise of tooth stress of the gear teeth of the rack carried by the piston and the sector gear may be so great as to cause damage to the gear teeth before the pressure relief mechanism of prior systems has been subjected to the requisite relief pressure necessary to open the relief mechanism and reduce the pressure in the hydraulic cylinder and the stress imposed on the gear teeth, due to the pressure wave propagation time.

The time delay between the rise of pressure in the hydraulic cylinder and the rise of pressure in the pressure relief mechanism in cases of severe road shock has been attributed to the compressibility of the hydraulic fluid, particularly at pressures above 2000 p.s.i., and the propagation of pressure waves in the conduit which interconnects the hydraulic cylinder and the pressure relief mechanism when the fluid is subjected to a severe and substantially instantaneous build up of pressure in the hydraulic cylinder.

It has therefore proven to be most advantageous to locate the pressure relief mechanism, in the form of a pair of relief valves directly within the body of the power piston at a point in close proximity to the hydraulic chambers in which propagation of a pressure wave is initiated. In addition to being as near as possible to the source of generation of mechanical shock, and translation of the mechanical shock from a solid transmission medium to a liquid transmission medium, the hydraulic fluid is passed from the high pressure chamber to the low pressure chamber and then to the system return header so that a great a distance as possible of fluid flow is provided for the relief discharge fluid. This greater distance of fluid travel aids in dissipating the heat generated due to the throttling function of the fluid during a pressure relief function so that the overall temperature of the system fluid is held as low as possible. In addition, placement of the system relief mechanism within the piston eliminates the necessity to provide a dumping function from one chamber to the other by mechanically tripped unloading valves. The hydraulic cylinder will automatically unload in response to a pressure buildup in a full lock turn condition of the steerable wheels.

Figure 2:
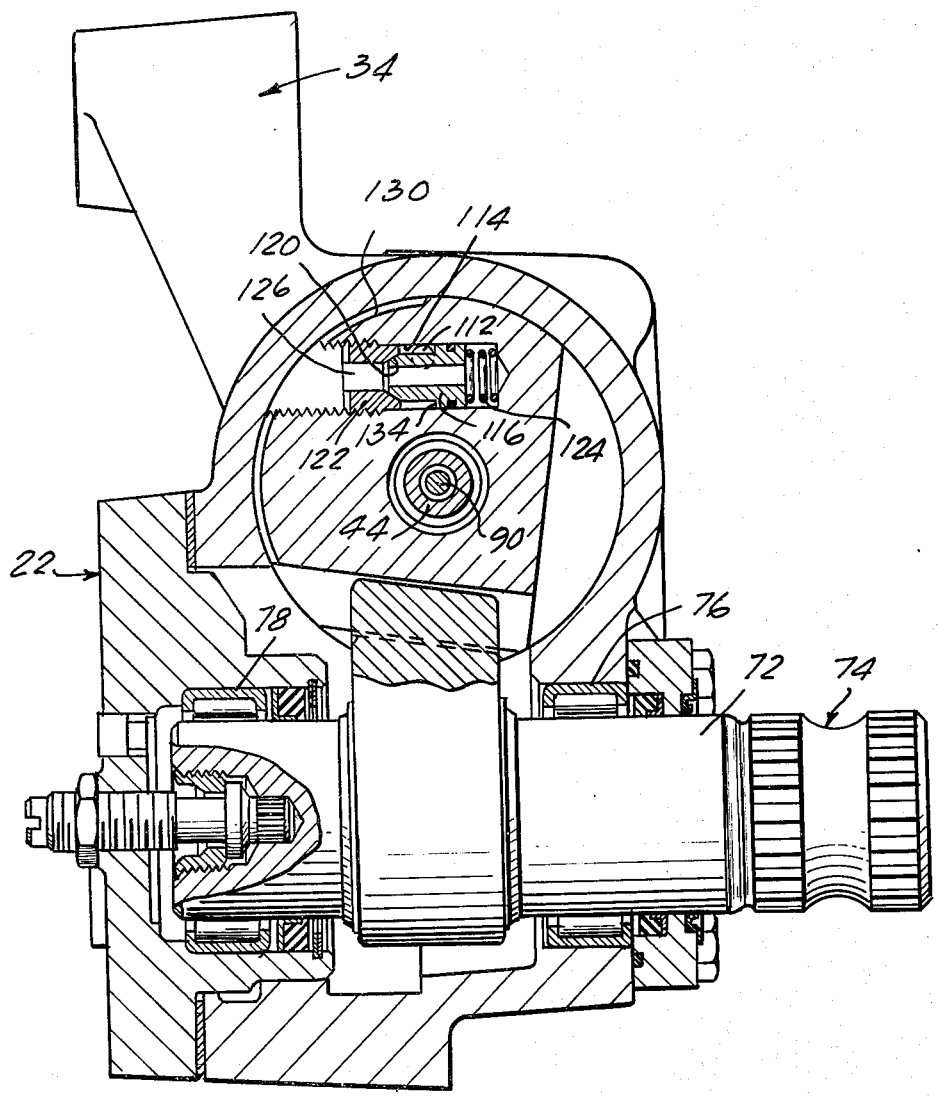
FIGS. 2 and 3 are sectional views of the power steering gear taken generally along the parting lines II—II and III—III of FIG. 1.

Referring now to FIGS. 1 and 2 together, an integral power steering gear 22 constructed in accordance with the principles of the present invention is illustrated as comprising a generally cylindrical housing 28 which is closed off at one end by an end cap 30 and at the other end by an end cap 32. The housing 28 has a plurality of flanges 34 for use in fastening the power steering gear 22 to the vehicle on which the power steering system 10 is utilized.

A power piston 36 is slidably carried within the housing 28 between the end caps 30 and 32 and with the elements 28, 30 and 32 defines a pair of chambers 38 and 40 at opposite ends of the power piston. The power piston 36 has a series of rack teeth 66 formed thereon for meshing engagement with a series of complementary teeth 68 formed on a sector gear 70. As can be seen in FIG. 2, the sector gear 70 is carried by a cross shaft 72 which is adapted at an end 74 for connection to the steering linkage of the steered wheels of the vehicle, such as by a pitman arm (not shown). The cross shaft 72 is journaled for rotation with a pair of bearings 76 and 78. As the piston 36 is moved in an axial direction within the cylinder 28 the sector gear 70 and the cross shaft 72 are rotated in a corresponding direction, as will be understood by those skilled in the art.

The inlet port 20 and the outlet port 24 which are respectively connected to the fluid supply header 18 and the fluid return header 26 are formed in the end cap 32, which also journals the steering shaft 44. The steering shaft 44 has an end 50 which extends from the end cap 32 and which is adapted for connection to a steering wheel or the like.

As mentioned above, the piston 36 divides the hydraulic cylinder 28 into two pressure chambers 38 and 40. It is readily apparent that when high pressure fluid is directed to the pressure chamber 38, the piston 36 will be urged in a direction toward the right as illustrated in FIG. 1 and a sector gear 70 and the cross shaft 72 will be rotated in a clockwise direction. On the other hand, when high pressure fluid is applied to the chamber 40, the piston 36 is urged toward the left as viewed in FIG. 1 and the sector gear 70 and the cross shaft 72 are rotated in a counterclockwise direction.

Fluid valve means, generally referenced 48, are provided for controlling the flow of fluid between the fluid inlet port 20, the pressure chambers 38 and 40, and the fluid outlet port 24. In the embodiment of the invention illustrated in the drawings, the valve means 48 comprises a rotary valve which includes a pair of relatively rotatable elements 47 and 49. The valve element 47 is formed integrally with and therefore jointly rotates with the steering shaft 44. The valve element 49 surrounds the valve element 47 and is rotatably carried within the end cap 32.

The piston 36 includes a central bore 42 through which a worm portion 45 of the steering shaft 44 extends. The shaft 44, it will be noted, is also journaled for rotation at the end cap 30 as indicated at the reference numeral 46. A driving connection is provided between the worm 45 and the bore 42 so that rotation of the worm 45 causes the piston 36 to shift axially within the hydraulic cylinder 28.

The driving connection particularly illustrated in the drawings, comprises a pair of helical grooves 52 and 56 formed in the worm 45 and the wall of the bore 42, respectively. A series of spherical members 54 are carried between corresponding portions of the helical grooves 52 and 54 for transmitting driving forces between the steering shaft 44 and the piston 36. A recirculating mechanism may be associated with the spherical members 54 for providing ingress and egress thereof between the cooperating helical grooves, in a manner well known by those skilled in the art.

Figure 3:
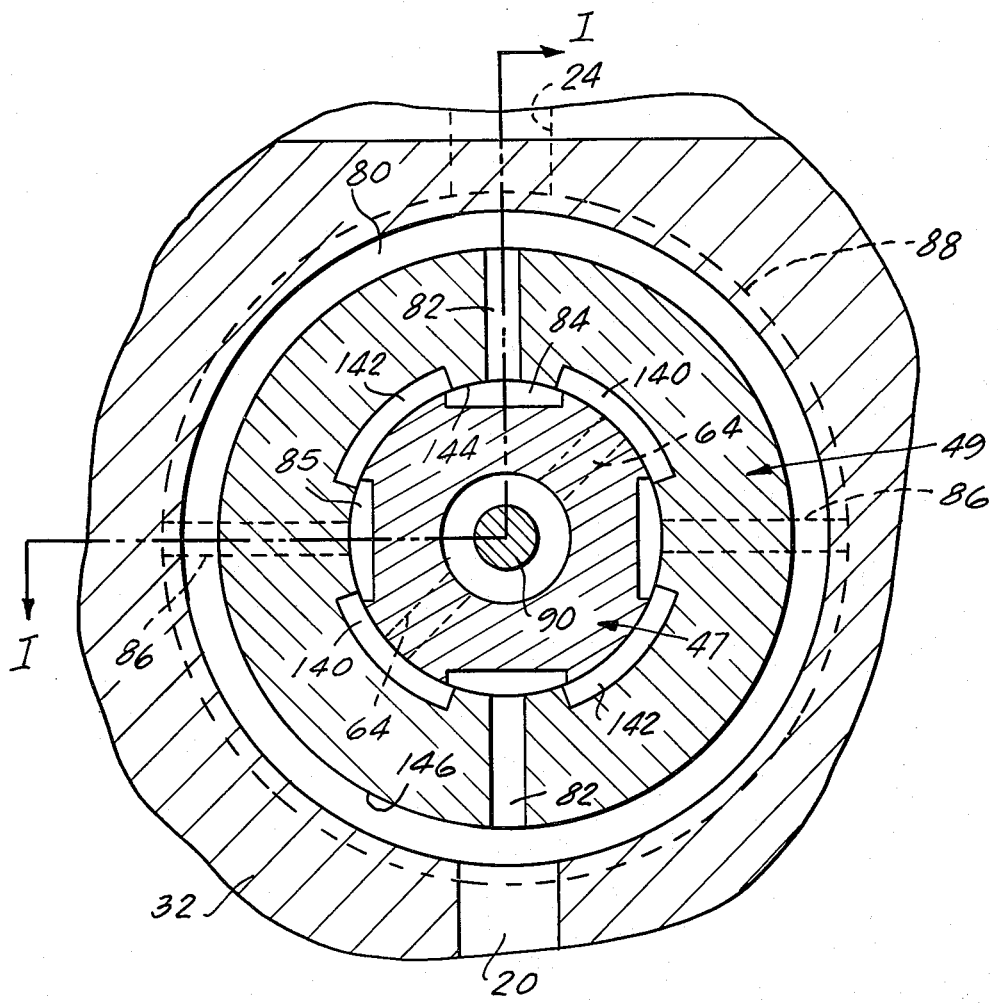

The valve mechanism illustrated herein is of the "open center" type whereby the fluid being pumped through the fluid supply header 18 to the inlet port 20 flows through the valve mechanism 48 to the outlet port 24 and by way of the fluid return header 26 to the reservoir 16 when the integral power steering gear 22 is in a neutral position, that is, when the piston 36 is not being moved axially in the hydraulic cylinder 28 to rotate the cross shaft 72. This condition obtains when the inner and outer valve members are in a center or neutral position as shown in FIG. 3. In this position, the incoming fluid flows through the inlet port 20, through an annular groove 80 formed in the end cap 32 to a pair of fluid passageways 82 within the valve member 49, through a pair of arcuate-shaped grooves 84 in the valve member 47, then through a pair of grooves 140 in the bore wall 144 of the valve member 49 and a pair of fluid passages 86 to an annular groove 88 formed in the end cap 32 which is in communication with the outlet port 24. In this condition, both of the pressure chambers 38 and 40 communicate with the fluid inlet port 20, the chamber 38 via the bores 64, 62 and 60, and the chamber 40 by way of the grooves 142 which open directly into that chamber (out of the drawing in FIG. 3).

It should be pointed out that FIG. 3 is a somewhat exaggerated illustration of the valve 48 with some of the construction details omitted and/or amplified to better illustrate the valve operation and for the sake of clarity and understanding of the invention. In this connection, it should also be noted that FIG. 1 is only a complete longitudinal section view along a vertical plane to the left side of the valve structure and is a generally 90° section at the valve as indicated in FIG. 3.

To actuate the integral power steering gear 22, the operator of the vehicle rotates the steering shaft 44 in the intended direction of turn, therefore rotating the valve member 47 relative the valve member 49 to cause the appropriate one of the pressure chambers 38 and 40 to communicate with the high pressure fluid in the flow passage 80 and the other pressure chamber to communicate with the flow passage 88. As can be seen in FIG. 3, the relative rotation necessary to power the piston is small because of the follow-up mechanism which will be discussed below. During follow-up, the valve members 47, 49 rotate together in the bore 146.

For example, in the embodiment illustrated, rotation of the steering shaft in a clockwise direction as viewed in FIG. 3 will cause the inner valve element 47 to rotate clockwise relative to the end cap 32. This relative rotation has the effect of causing the high pressure fluid in the flow passage 80 to communicate with the pressure chamber 38 via the grooves 140 and the bores 64, 62 and 60, thus causing the piston 36 to be urged toward the right and the cross shaft 72 to be rotated in a clockwise direction. The fluid expelled from the pressure chamber 40 communicates through the valve 48 via the grooves 142, the bores 86 and the flow passage 88 from where it exits through the outlet port 24 and is returned to the reservoir 16 by way of the return header 26.

Conversely, counterclockwise rotation of the shaft 44 causes the pressure groove 80 to be placed in communication with the pressure chamber 40 via the bores 82 and the grooves 84 and 142, and the chamber 38 to be placed in communication with the passage 88 via the bores 60, 62, 64, the grooves 140 and 85 and the bores 86. In this condition, the piston 36 is urged toward the left, whereby the rack teeth 66 cooperate with the sector teeth 68 to rotate the cross shaft 72 in a counterclockwise direction.

When the operator ceases to rotate the steering shaft 44, however, the piston 36 will continue to move and the worm 45 and the valve element 47 will continue to rotate until once again the two valve elements are arranged in a neutral position with respect to one another and with respect to the end cap 32.

A variety of follow-up valve mechanisms for controlling the flow of fluid to and from the two pressure chambers 38 and 40 are well known in the art and since the details of the specific embodiment of the valve 48 are not essential to the understanding of the present invention, they shall be omitted in the interest of brevity.

The two valve elements 47 and 49 may be biased to the neutral position thereof by any suitable biasing means. In the illustrated embodiment an axial bore 62 is provided in the steering shaft 44 and receives therethrough a slender torsion rod 51 which is connected fast at one end 94 to the valve element 47 and at the opposite end 92 to the main body of the steering shaft 44. Among the functions of the torsion rod 90 is to ensure that the valve elements 47 and 49 become aligned in the neutral position thereof when the steering shaft 44 is not being rotated and to provide a certain "feel of the road" for the operator of the vehicle, as will be understood by those skilled in the art.

As illustrated in FIG. 1, the piston 36 is provided with a seal 37 between the chambers 38 and 40 so as to prevent leakage between these chambers. According to the invention, a relief mechanism 96 is located within the piston 36 for effecting fluid communication between the chambers 38 and 40 bypassing the seal 37 in response to pressure levels which would be deleterious to the steering system components and operation. The relief mechanism 96 includes a valve member 98 which is slidably carried within a longitudinal bore 100 and biased by means of a spring 102 to seat at 104 with a seating member 106. The seating member 106 is provided with a central bore 108 which communicates with the chamber 40. The valve member 98 is provided with a central bore 110 which communicates with the chamber 40 by way of the bore 108 and which communicates with a transverse bore 114 by way of a longitudinal bore 112.

The bore 114 has a valve member 116 slidably mounted therein and urged by a spring 124 to seat at 120 with a seating member 122. The seating member 122 is provided with a central bore which communicates with the chamber 38 by way of an arcuate groove 130 (FIG. 2). As can be seen in FIG. 1, the arcuate groove 130 communicates with the bore 100 by way of a bore 132.

The relief mechanism 96 operates as follows. Assuming a pressure build up to the relief pressure within the chamber 40, such pressure is effective via the bores 108, 110, 112 and 114 against a surface 134 of the valve member 116 to unseat the valve member at 120 and communicate the chamber 40 therethrough to the arcuate groove 130 and the chamber 38.

Assuming a relief pressure is obtained in the chamber 38, such pressure is effective by way of the groove 130 and the bore 132 to the bore 100 and against a surface 138 of the valve member 98 to unseal the valve member at 104 and thereby communicate the chamber 38 by way of the bore 108 with the chamber 40. In either of the just mentioned operations, relief action is quickly responsive to the relief pressure. Also in either situation it is readily apparent that the relief pressure may be obtained and quick relief provided therefore in response to road shock and/or pressure build up at a full turn maneuver. It is also readily apparent that the relief oil flow must still be returned to the pump by way of the outlet port 24 and the return header 26 so as to provide the maximum possible path for cooling.

Inasmuch as the pressure relief function is substantially instantaneous, seals are protected against excessive pressure loads and the steering linkage and the rack and sector teeth are protected from excessive loads so that it is not necessary to increase the design requirements with respect to the expectation of excessive road shock pressures or the like.

Although we have described our invention by reference to a specific illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A vehicular power steering system utilizing pressurized fluid for actuating a hydraulic piston against varying supply pressure and pressure surges generated in response to road shock so long as the pressure does not exceed a predetermined value comprising:

an integral power steering gear including a housing, means defining a power cylinder in said housing having first and second ports located respectively at the opposite ends thereof, an axially bored power piston slidably carried in said cylinder and rack teeth carried on said power piston, a cross shaft journaled on said housing for rotating about an axis which extends transversely to the axis of said power cylinder and a sector gear carried on said cross shaft in meshing engagement with said rack teeth, a worm extending in axial alignment into said bore of said piston, cooperating drive means interconnecting said worm and said power piston for rotating said worm in response to axial movement of said power piston, a steering shaft journaled on said housing in axial alignment with said worm, means interconnecting said worm and said steering shaft for rotating said worm in response to rotation of said steering shaft, steering valve means in said housing operably connected to said steering shaft and movable in response to relative rotation of said steering shaft and said cross shaft in excess of a predetermined relative angle of rotation, and means defining an inlet port and an outlet port in said housing;

a power fluid pump having a high pressure side and a low pressure side;

a fluid supply header connecting said inlet port to said high pressure side of said power fluid pump;

a fluid return header connecting said outlet port to said low pressure side of said power fluid pump;

first fluid passage means formed in said housing connecting said inlet port to said steering valve means;

second fluid passage means formed in said housing connecting said outlet port to said steering valve means;

third fluid passage means connecting said steering valve means to said first power cylinder port;

fourth fluid passage means connecting said steering valve means to said second power cylinder port;

said fluid supply header and said first fluid passage means constituting high pressure circuits and said fluid return header and said second fluid passage means constituting low pressure circuits, said steering valve means being movable between a normal position at which fluid communication between said first and second fluid passage means and said third and fourth fluid passage means is open and first and second operating positions at one of which said first fluid passage means is connected to said third fluid passage means and said second fluid passage means is connected to said fourth fluid passage means, and at the other of which said first fluid passage means is connected to said fourth fluid passage means and said second fluid passage means is connected to said third fluid passage means, said neutral position of said steering valve means obtaining when said predetermined relative angle of rotation between said steering shaft and said cross shaft is not exceeded, said first operating position obtaining when said steering shaft is rotated in one direction and said predetermined relative angle of rotation between said steering shaft and said cross shaft is exceeded and said second operating position obtaining when said predetermined relative angle of rotation between said steering shaft and said cross shaft is exceeded;

means defining fifth fluid passage means through said piston for fluid communication between the opposite ends of said cylinder; said fifth fluid passage means including an arcuate peripheral groove in and extending about a portion of said piston in communication with one end of said cylinder;

first bore means extending from said groove to the other end of said cylinder; and pressure relief valve means disposed in and normally closing said fifth fluid passage means and arranged so as to be subjected to the fluid pressure between the ends of said power piston and the respective ends of said power cylinder and operable to open in response to said predetermined value of pressure to permit fluid flow between the ends of said power cylinder to relieve excess pressure, said pressure relief valve means including a first valve disposed in said first bore means and normally closing said first bore means and having an axial bore aligned with said first bore means for communication therethrough; and a second valve disposed in said first bore means in an opposite flow direction to that of said first valve and normally closing said first bore means.

2. The invention as defined in claim 1 wherein said cooperating drive means comprises helical grooves formed in the wall of said piston bore and on the peripheral wall of said worm and recirculating drive transmitting balls carried within said grooves.

3. The invention as defined in claim 1 wherein said steering valve means comprises a pair of relatively rotatable valve elements connected respectively to said steering shaft and to said worm for joint rotation therewith.

4. A power steering apparatus comprising a cyliner having first and second end portions, a piston slidably disposed within said cyliner and cooperating with said first and second end portions of said cylinder to at least partially define first and second variable valume chambers, said piston including surface means for at least partially defining pressure relief passage means for conducting fluid between said first and second variable volume chambers, said pressure relief passage means including a first passage disposed in said piston and a second passage disposed in said piston and extending between said first passage and said second variable volume chamber, said first passage including a first end portion opening into said first variable volume chamber, a second end portion opening into said second variable volume chamber, and an intermediate portion extending between said first and second end portions, a rack gear connected with said piston, a second gear disposed in meshing engagement with said rack gear and rotatable under the influence of said rack gear upon movement of said piston relative to said cylinder to effect a steering action, steering valve means connected in fluid communication with said first and second variable volume chambers, said steering valve means being actuatable to a first operating condition porting fluid under pressure to said first variable volume chamber to effect movement of said piston and rack gear in a first direction to rotate said second gear in one direction, said steering valve means being actuatable to a second operating condition porting fluid under pressure to said second variable volume chamber to effect movement of said piston and rack gear in a second direction opposite from said first direction to rotate said second gear in a direction opposite from said one direction, and pressure relief valve means mounted on said piston and movable therewith relative to said cylinder for enabling fluid to flow between said variable volume chambers through said pressure relief passage means when the fluid pressure in one of said variable volume chambers exceeds the fluid pressure in the other of said variable volume chambers by a predetermined amount and for blocking fluid flow through said pressure relief passage means when the fluid pressure in one of said variable volume chambers exceeds the fluid pressure in the other of said variable volume chambers by an amount which is less than said predetermined amount, said pressure relief valve means including first valve means disposed in said first end portion of said first passage and operable from a closed condition to an open condition under the influence of the fluid pressure in said second passage when the fluid pressure in said second variable volume chamber exceeds the fluid pressure in said first variable volume chamber by the predetermined amount, said first valve means being effective in the closed condition to block fluid flow between said first variable volume chamber and said second passage and to transmit fluid pressure from said first variable volume chamber to said intermediate portion of said first passage, said first valve means being effective in the open condition to allow fluid to flow between said first variable volume chamber and said second passage, and second valve means disposed in said second end portion of said first passage and operable from a closed condition to an open condition under the influence of the fluid pressure in said intermediate portion of said first passage when the fluid pressure in said first variable volume chamber exceeds the fluid pressure in said second variable volume chamber by the predetermined amount, said second valve means being effective in the closed condition to block fluid flow between said second variable volume chamber and said intermediate portion of said first passage.

* * * * *